US005777204A

United States Patent [19]

Abe

[11] Patent Number: 5,777,204

[45] Date of Patent: Jul. 7, 1998

[54] AIR-FUEL RATIO DETECTING DEVICE AND METHOD THEREFOR

[75] Inventor: Shinichi Abe, Aichi-gun, Japan

[73] Assignee: Toyota Jidosha Kabushiki Kaisha, Aichi, Japan

[21] Appl. No.: 785,147

[22] Filed: Jan. 13, 1997

[30] Foreign Application Priority Data

Jan. 16, 1996 [JP] Japan .................................... 8-005004

[51] Int. Cl.⁶ .......................... G01N 27/12; G01N 31/00; F02M 51/00

[52] U.S. Cl. .................................... 73/23.32; 364/431.04; 123/424; 123/489; 123/440; 60/276

[58] Field of Search .......................... 73/23.32; 123/489, 123/440, 424, 493; 60/276, 285, 277; 364/431.01, 431.04, 431.061

[56] References Cited

U.S. PATENT DOCUMENTS

| | | | |
|---|---|---|---|
| 4,130,095 | 12/1978 | Bowler et al. | 123/32 EE |
| 4,306,444 | 12/1981 | Hattori et al. | 73/23 |
| 4,344,317 | 8/1982 | Hattori et al. | 73/23 |
| 4,363,306 | 12/1982 | Sone et al. | 123/440 |
| 4,440,621 | 4/1984 | Kitahara et al. | 204/406 |
| 4,592,325 | 6/1986 | Nakagawa | 123/489 |
| 4,729,220 | 3/1988 | Terasaka et al. | 60/285 |
| 4,751,907 | 6/1988 | Yamamoto et al. | 123/489 |
| 4,753,203 | 6/1988 | Yamada | 123/440 |
| 4,837,698 | 6/1989 | Amano et al. | 364/431.07 |
| 4,905,652 | 3/1990 | Nakajima et al. | 123/479 |
| 4,915,813 | 4/1990 | Nakajima et al. | 204/406 |
| 4,938,196 | 7/1990 | Hoshi et al. | 123/489 |
| 5,052,361 | 10/1991 | Ono et al. | 123/489 |
| 5,249,453 | 10/1993 | Usami et al. | 73/23.32 |
| 5,265,458 | 11/1993 | Usami et al. | 73/23.32 |
| 5,323,635 | 6/1994 | Ueno et al. | 73/23.32 |
| 5,340,462 | 8/1994 | Suzuki | 204/425 |
| 5,417,099 | 5/1995 | Ohuchi | 73/23.32 |
| 5,461,902 | 10/1995 | Iwata | 73/23.32 |
| 5,473,889 | 12/1995 | Ehard et al. | 60/276 |
| 5,600,056 | 2/1997 | Hasegawa et al. | 73/23.32 |
| 5,610,321 | 3/1997 | Shinmoto | 73/23.32 |

FOREIGN PATENT DOCUMENTS 62-214249A 9/1987 Japan .

OTHER PUBLICATIONS

U.S. application No. 08/591,787, Nasu, M., filed Jan. 25, 1996, Class 364, Subclass 431.05.

*Primary Examiner*—Hezron E. Williams
*Assistant Examiner*—J. David Wiggins
*Attorney, Agent, or Firm*—Kenyon & Kenyon

[57] ABSTRACT

A device for detecting the air-fuel ratio in an engine comprises a limiting current type air-fuel ratio sensor 20, an air-fuel ratio sensor circuit 30, a detecting means 40, a determining means 50 and a correcting means 60. The air-fuel ratio sensor 20, which is arranged in an exhaust system of the engine 10, generates an electric current when a voltage is applied thereto and is made from solid electrolyte. The sensor circuit 30 applies a voltage to the sensor 20 within a range of the limiting current, detects a concurrent limiting current and outputs a signal proportional to the magnitude of the detected current. The detecting means 40 detects a change in the voltage output from the sensor circuit 30 when the voltage applied to the sensor 20 is changed from a voltage within the range of the limiting current to a voltage outside the range of the limiting current a predetermined time after the engine 10 is started. The determining means 50 determines whether the change in output voltage of the sensor circuit 30 is less than a predetermined and correcting means 60 corrects an output error of the sensor circuit 30 based on the voltage output from the sensor circuit 30 when it is determined that the output voltage change is less than the predetermined value.

3 Claims, 7 Drawing Sheets

AIR-FUEL RATIO DETECTING DEVICE AND METHOD THEREFOR

BACKGROUND OF THE INVENTION

1. Field of the Invention

The present invention relates to an air-fuel ratio detecting device and a method therefore and particularly, to an air-fuel ratio detecting device and a method which correctly and very precisely detects the air-fuel ratio in an internal combustion engine based upon the characteristics of each limiting current type air-fuel ratio sensor and each air-fuel ratio sensor circuit.

2. Description of the Related Art

There has been known a linear air-fuel ratio sensor which is disposed in the exhaust system of an internal combustion engine (hereinafter referred to as an engine), and which detects the air-fuel ratio in the engine from the exhaust gas of the engine and generates an output which is proportional to the air-fuel ratio that is detected. In a device for controlling the air-fuel ratio by feedback with the use of the air-fuel ratio sensor according to the prior art, a map for calculating the air-fuel ratio in the engine corresponding to the output of the air-fuel ratio sensor is formed in advance through a bench test, the formed map is stored in a storage circuit, the air-fuel, ratio in the engine is calculated from the map and from the output of the air-fuel ratio sensor mounted on the real engine, and the air-fuel ratio in the engine is so controlled by feedback as to approach a target air-fuel ratio, for example, a stoichiometric air-fuel ratio at which the exhaust gas of the engine is best purified.

However, in such an air-fuel ratio feedback control device according to the prior art as described above, an air-fuel ratio sensor and a processing circuit (hereinafter referred to as an air-fuel ratio sensor circuit) for supplying electric power to the air-fuel ratio sensor and processing the output from the air-fuel ratio sensor, used for the bench check to form the map for calculating the air-fuel ratio in the engine, are different from those really use for the engine. Therefore, the air-fuel ratio in the engine that is really detected involves an error. In other words, it does not serve as a correct value, lacks reliability in controlling the air-fuel ratio by feedback, and makes it difficult to purify the exhaust gas of the engine to a high degree.

To solve this-problem, the same application as in the present patent application proposed an air-fuel ratio detecting device in Japanese Patent Application No. 7-12325, which corrects an error in the output caused by the air-fuel ratio sensor and the air-fuel ratio sensor circuit and correctly and precisely detects the air-fuel ratio in the engine. This device is designed to take into consideration that a first output data from the air-fuel ratio sensor circuit when the air-fuel ratio sensor is inactive equals to a second output data from the air-fuel ratio sensor circuit corresponding to the stoichiometric air-fuel ratio when the air-fuel ratio sensor is active, and to correct the error of the output data from the air-fuel ratio sensor circuit when determining the air-fuel ratio in the engine after defining that the first output data is equals to the second output data, thereby obtaining the accurate air-fuel ratio.

However, in the device proposed by the Japanese Patent Application. No. 7-12325, whether or not the air-fuel ratio sensor is inactive is determined by water temperature of the engine. Therefore, it is possible to determine incorrectly when the water temperature of the engine does not match the temperature of a sensing element in the air-fuel ratio sensor and, as a result, it is possible that the device may incorrectly detect the above first output data corresponding to the stoichiometric air-fuel ratio.

SUMMARY OF THE INVENTION

The present invention has been made in view of the foregoing problems and it is therefore an object of the present invention to provide an air-fuel ratio detecting device and a method therefor which surely determines an inactive state of the air fuel ratio sensor and avoids incorrectly detecting the output data of the air-fuel ratio sensor circuit corresponding to the stoichiometric air-fuel ratio, thereby accurately and precisely detecting the air-fuel ratio in the engine.

FIG. 1 is a diagram showing the constitution of fundamental blocks according to the present invention. In FIG. 1, the part surrounded by broken lines is the air-fuel ratio detecting device of the present invention.

In order to accomplish the above object, an air-fuel ratio detecting device 1 for detecting the air-fuel ratio in an internal combustion engine 10 comprises a limiting current type air-fuel ratio sensor 20 and an air-fuel ratio sensor circuit 30 which detects the air-fuel ratio in the engine based on the output of the air-fuel ratio sensor circuit 30.

In the air-fuel ratio detecting device, the limiting current type air-fuel ratio sensor 20 is arranged in an exhaust system of the engine 10, generates an electric current when an electric voltage is applied thereto and is made from solid electrolyte, and the air-fuel ratio sensor circuit 30 applies the electric voltage to the sensor 20 within a range of the limiting current, detects the concurrent limiting current and outputs a signal proportional to the magnitude of the detected current.

The air-fuel ratio detecting device is characterized in that it comprises: a detecting means 40 for detecting a change in output voltage of the sensor circuit 30 when an applied voltage to the sensor 20 is changed from a voltage within the range of the limiting current to a voltage out of the range of the limiting current at a determined time after the engine 10 is started; a determining means 50 for determining whether the change in the output voltage of the sensor circuit 30 detected by the detecting means is less than a determined value or not; and a correcting means 60 for correcting the output error of the sensor circuit 30 corresponding to the air-fuel ratio based on the output voltage of the sensor circuit 30 when the determining means 50 determines that the output voltage change is less than the determined value.

The above air-fuel ratio detecting device 1 outputs a voltage corresponding to the air-fuel ratio in the engine 10 from the air-fuel ratio sensor circuit 30 connected to the limiting current type air-fuel ratio sensor 20 exposed to the exhaust gas of the engine 10. The correcting means 60 inputs the correct data corresponding to the air-fuel ratio in the engine 10 to a fuel injection amount controlling means 70 after correcting the output data from the sensor circuit 30. The fuel injection amount controlling means 70 calculates and supplies the fuel injection amount so that the air-fuel ratio in the engine 10 becomes a target ratio based on the data output from the correcting means 60.

In order to accomplish the above object, an air-fuel ratio detecting method for detecting the air-fuel ratio in an internal combustion engine 10 uses an air-fuel ratio detecting device 1 which comprises a limiting current type air-fuel ratio sensor 20 in real use and an air-fuel ratio sensor circuit 30 in real use, and detects the air-fuel ratio in the engine based on the output of the air-fuel ratio sensor circuit 30. In the air-fuel ratio detecting device, the limiting current type air-fuel ratio sensor 20 in real use is arranged in an exhaust system of the engine 10, generates an electric current when an electric voltage is applied thereto and is made from solid electrolyte. The air-fuel ratio sensor circuit 30 in real use applies the electric voltage to the sensor 20 within a range of the limiting current, detects the concurrent limiting current and outputs a signal proportional to the magnitude of the detected current.

The air-fuel ratio detecting method according to the present invention is characterized in that it comprises the steps of: detecting a change in output voltage of the sensor circuit 30 when an applied voltage to the sensor 20 is changed from a voltage within the range of the limiting current to a voltage out of the range of the limiting current at a determined time after the engine 10 is started; determining whether the change in the output voltage of the sensor circuit 30 detected in the first step is less than a determined value or not; reading a first output data of the sensor circuit 30 in real use when it is determined in the second step that the output voltage change is less than the determined value; reading a second output data of a reference sensor circuit corresponding to the stoichiometric air-fuel ratio from a previously created map with the use of a reference sensor and the reference sensor circuit, said map being made for calculating output data of the reference sensor circuit corresponding to the air-fuel ratio in the engine 10; correcting each output data of the sensor circuit 30 in real use after said determined time has passed from the engine start up based on an output error between the first output data and the second output data; and calculating each air-fuel ratio corresponding to the corrected output data corrected in the fifth step.

The mode of operation of the present invention will be explained below.

The detecting means changes an applied voltage to the sensor from a voltage within the range of the limiting current to a voltage out of the range of the limiting current at a predetermined time after the engine is started, and detects a change in output voltage of the sensor circuit. When the sensor element is warmed up, the determining means can surely determine whether or not the change in the output voltage of the sensor circuit is less than a determined value, namely, the inactive state of the sensor can be more accurately determined. The correcting means compares the output voltage of the sensor circuit at a time when the sensor is inactive as to the output voltage of the sensor circuit corresponding to the stoichiometric air-fuel ratio in the engine at a time when the sensor is active and, thereby, the output voltage of the sensor circuit corresponding to the stoichiometric air-fuel ratio can be accurately detected. The correcting means then corrects the error between a first output voltage of the sensor circuit in real use corresponding to an air-fuel ratio in the engine and a second output voltage of a reference air-fuel ratio sensor circuit corresponding to the same air-fuel ratio in the engine based on the output voltage of the sensor circuit in real use corresponding to the stoichiometric air-fuel ratio in the engine. The second output voltage is obtained when detecting the air-fuel ratio in the engine with the use of the reference air-fuel ratio sensor and the reference air-fuel ratio sensor circuit. Thus the air-fuel ratio in the engine is more accurately detected.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

The preferred embodiments of the present invention will be described below with reference to the accompanying drawings.

Figure 1:
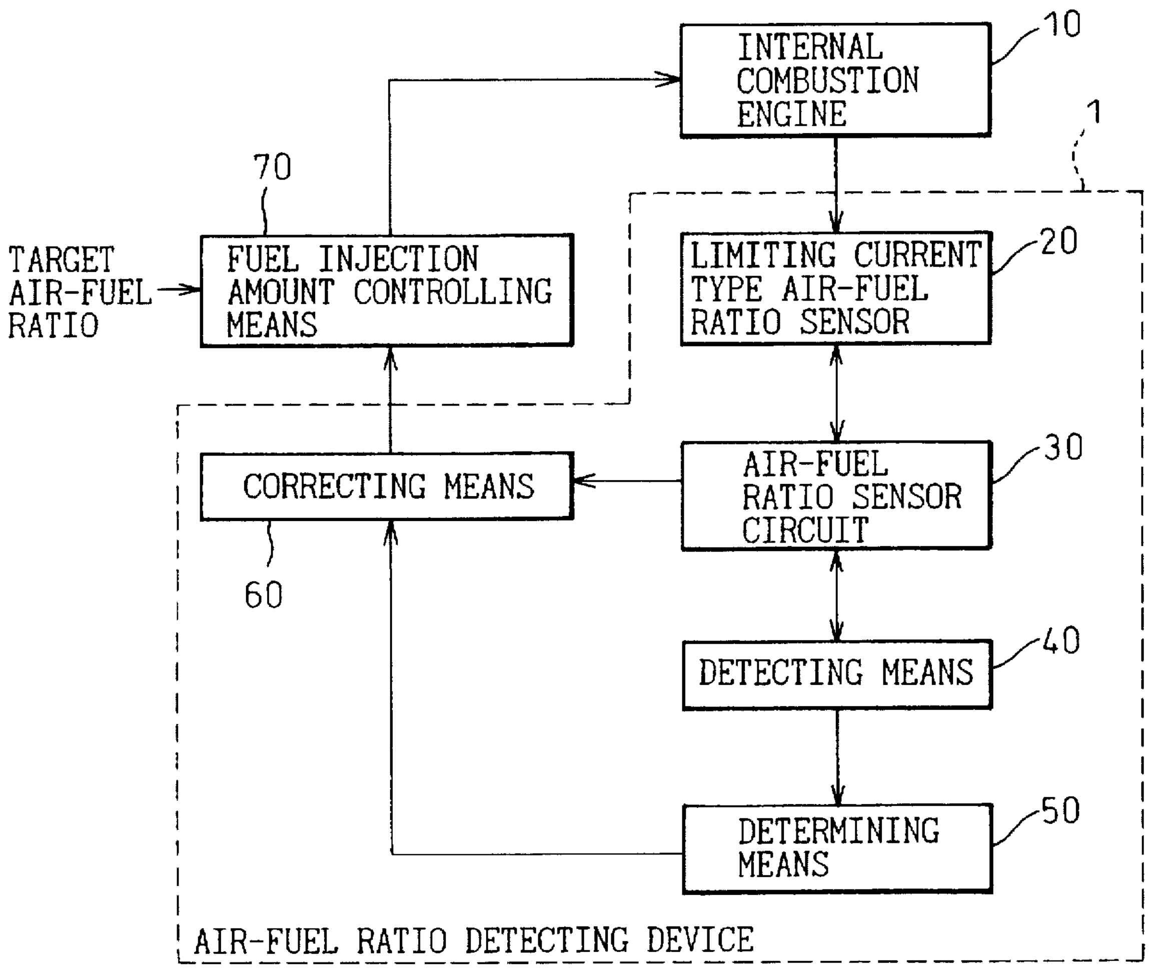
FIG. 1 is a diagram showing the constitution of fundamental blocks according to the present invention.
Figure 2:
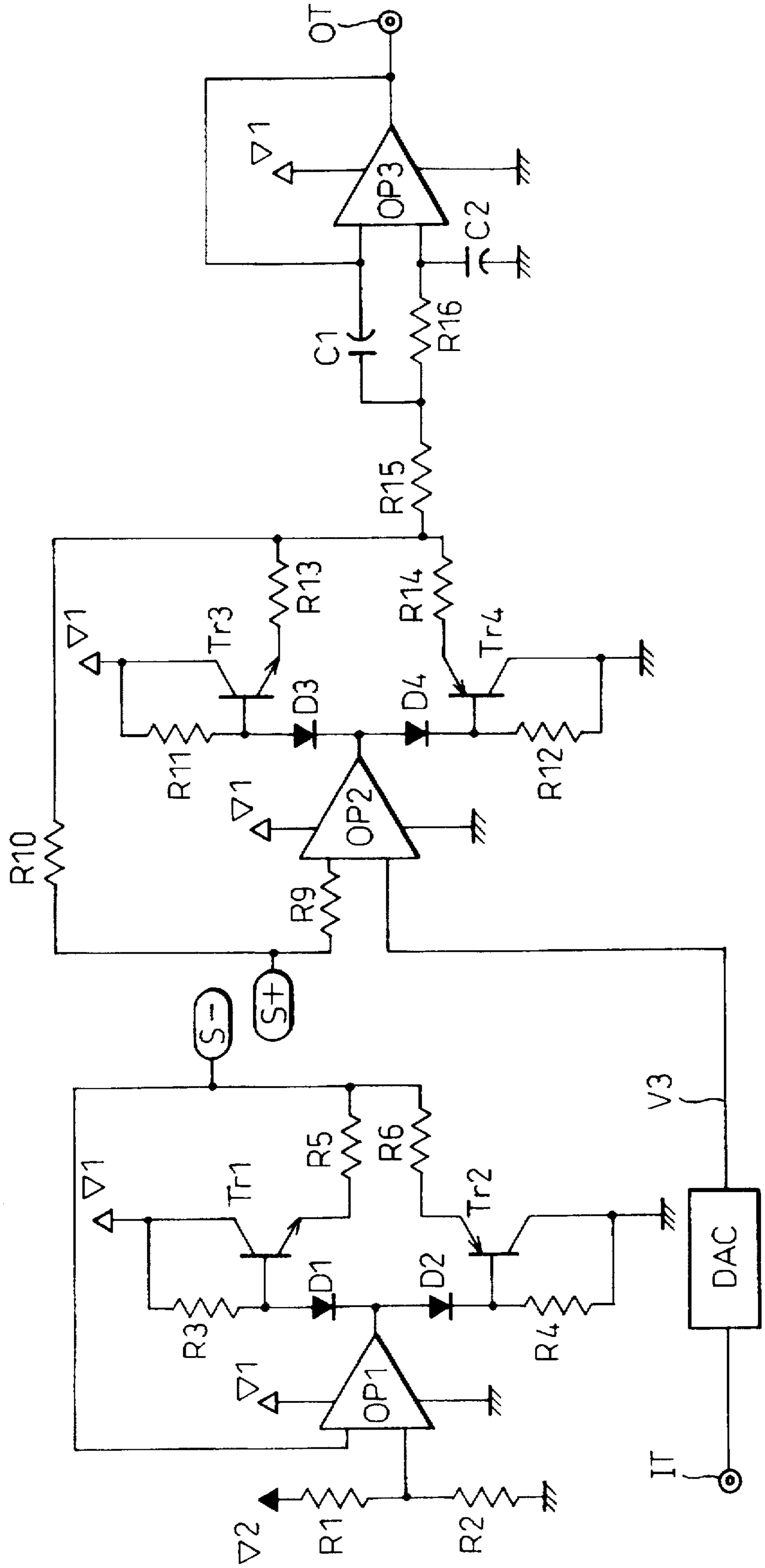
FIG. 2 is a diagram illustrating an air-fuel ratio sensor circuit employed by an embodiment.

FIG. 2 is a diagram, illustrating an air-fuel ratio sensor employed by an embodiment of the present invention. In FIG. 2, reference numerals R1 to R6 and R9 to R16 denote resistors, C1 and C2 denote capacitors, D1 to D4 denote diodes, Tr1 to Tr4 denote transistors, and OP1 to OP3 denote operational amplifiers. Constant voltages V1 and V2 are applied to the air-fuel ratio sensor circuit (hereinafter referred to as a sensor circuit), and a limiting current type air-fuel ratio sensor (hereinafter referred to as a sensor) that is not shown is connected between electrodes S+ and S− between the operational amplifiers OP1 and OP2 as shown in FIG. 2. Then, a constant voltage set by the operational amplifiers OP1 and OP2 is applied to the sensor connected across the above electrodes. The resistor R10 works to detect an electric current generated by the sensor. The voltage V1 is applied to drive the transistors Tr1 to Tr4, operational amplifiers OP1 to OP3, and the sensor. A voltage V2 is applied to provide a very precise reference voltage to the operational amplifier OP1. The voltage V2 is about 5 volts, so a voltage of 3.0 volts divided by the resistors R1 and R2 is input to the operational amplifier OP1.

A digital to analog converter DAC is provided between an input terminal IT and an input of the OP2. The input terminal IT is connected to an electronic control circuit ECU (not shown) which supplies the digital signal to the DAC. Output voltage V3 of the DAC is controlled by means of the ECU to become 2.8 volts at a time when the engine is started and 3.3 volts after a determined time has passed from the start of the engine, and is input to the operational amplifier OP2. Next, the output of the OP2 varies in response to a voltage applied to the sensor connected between the electrodes S+ and S− an air-fuel ratio in the exhaust gas of the engine. The output of the OP2 becomes equal to the voltage V3 when the sensor is inactive or when the air-fuel ratio in the exhaust gas of the engine is stoichiometric because the internal electric current of the sensor becomes 0 mA at this time. Next, the output of the OP2 is input to the operational amplifier OP3 that works as an integrating circuit, thus a stable voltage which does not transiently change is output from an output terminal OT of the sensor circuit in response to the air-fuel ratio in the engine. In the present invention, the electronic control unit ECU is, for example, made by a microprocessor system including a CPU, a RAM, a ROM, input/output interfaces and the like, and performs basic engine controls such as the fuel injection amount control, the ignition timing control and the like.

Figure 3:
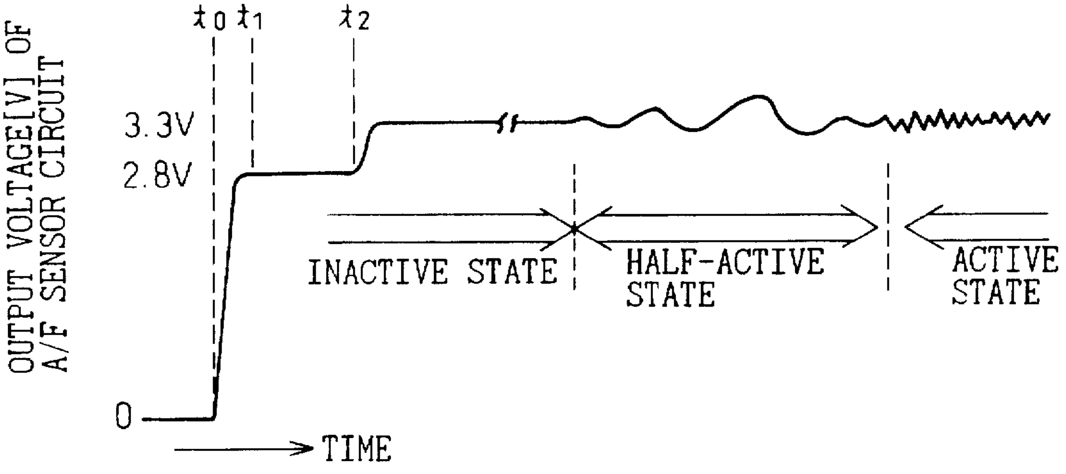
FIG. 3 is a diagram illustrating output waveforms of the air-fuel ratio sensor circuit immediately after the start of an engine.

FIG. 3 is a diagram illustrating output waveforms of an air-fuel ratio sensor circuit shown in FIG. 2 immediately after the start of the engine, wherein the abscissa represents the time and the ordinate represents the output voltage of the sensor circuit. When the engine is, started at the moment $t_0$, voltages are applied from a battery and the ECU to the sensor circuit and to the sensor, and the output voltage of the sensor circuit which is 0 volt at the moment $t_0$, suddenly rises up to 2.8 volts which is same as the voltage V3 at the moment $t_1$, that is, for example, two seconds after the moment $t_0$ because the voltage V3 shown in FIG. 2 is preset so as to become 2.8 volts at the start of the engine, namely, at the moment $t_0$, by means of the ECU. The output of the sensor circuit suddenly rises up to 3.3 volts at the moment $t_2$ that is five seconds after the moment $t_0$ because the voltage V3 is preset so as to become 3.3 volts at the moment $t_2$ by means of the ECU. The output voltage of the sensor circuit remains constant at 3.3 volts as long as the sensor is in an inactive state. As the air-fuel ratio sensor becomes partially active, however, the output voltage fluctuates at a low frequency, with 3.3 volts as a center, as shown. Then, as the sensor becomes active at the moment $t_3$ that is ten seconds after the moment $t_0$, the output voltage fluctuates at a high frequency with 3.3 volts as a center. As described earlier, the output current generated by the sensor becomes zero (0 mA) when the air-fuel ratio in the exhaust gas detected by the sensor is stoichiometric or when the sensor is in the inactive state. Therefore, the output voltage of the sensor circuit under these conditions becomes 2.8 volts at the engine start up time and 3.3 volts after the engine started up.

Next, an output of the operational amplifier OP2 will be explained below. The air-fuel ratio sensor comprising an electrolyte connected between the electrodes S+ and S− is arranged in the exhaust system of the engine, exposed to the exhaust gas from the engine, and the internal current of the sensor varies. The output of OP2 changes in response to changes of the current generated in the sensor. As long as a voltage, for example, 3.3 volts that is within the limiting current range is applied to the sensor, the sensor does not generate the internal current when the exhaust gas from the engine is stoichiometric or the sensor is inactive. Therefore, the air-fuel ratio detecting device proposed in the Japanese Patent Application No. 7-12325 determines that the sensor is inactive when the coolant of the engine is below 30 degrees (°C.), continually supplies 3.3 volts to the sensor when the engine is running, and corrects the output error of the sensor circuit after regarding an average output voltage of the sensor circuit for a determined period from the start of the engine as the stoichiometric voltage that is the output voltage of the sensor circuit when the sensor detects the stoichiometric air-fuel ratio in the exhaust gas from the engine.

However, the sensor is not always in an inactive state during a determined period of time from the engine start up but the sensor may be in a half-active state or an active state as shown in FIG. 3 even though the coolant temperature is below 30 degrees. For example, the sensor is in a half-active state or an active state during a period of time after the engine is restarted soon after a short stop of the engine although the coolant temperature is, for example, 25 degrees. In this case, if the output voltage of the sensor circuit is regarded as the stoichiometric voltage, the fluctuated output voltage of the sensor circuit at the time when the sensor is in a half-active state or the active state as shown in FIG. 3, is detected, so that an accurate stoichiometric voltage cannot be detected.

Hereinafter, characteristics of the air-fuel ratio sensor will be explained.

Figure 4:
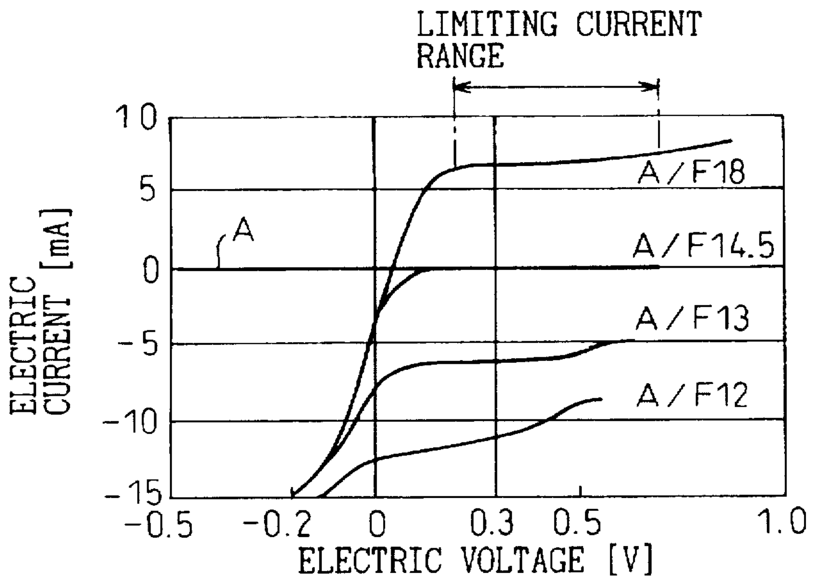
FIG. 4 is a diagram illustrating characteristic curves of an air-fuel ratio sensor.

FIG. 4 is a diagram illustrating characteristic curves of an air-fuel ratio sensor which are different depending on air-fuel ratios. In FIG. 4, the abscissa represents the supply voltage to an air-fuel ratio sensor and the ordinate represents the current generated by the sensor. In FIG. 4, a thick solid direct line A represents a characteristic curve of an air-fuel ratio sensor when the temperature of the sensor element is about 400 degrees, that is an inactive state, while other characteristic curves represent when the temperature of the sensor element is about 700 degrees, that is an active state. From FIG. 4, it can be understood that the internal current of the sensor is 0 mA when the air-fuel ratio to be detected by the sensor is stoichiometric, namely, about 14.5 and that the current linearly changes in response to the changes of the air-fuel ratio, under the conditions that the power supply to the sensor is, for example, 0.3 volts which is in the limiting current range and when the sensor is in an active state in which temperature of the sensor element is 700 degrees. On the other hand, it can be understood that the internal current of the sensor is constant at 0 mA as indicated A in FIG. 4 when the sensor is in an inactive state in which the temperature of the sensor element is 400 degrees, and is about −15 mA when the sensor is in an active state in which the temperature of the sensor element is 700 degrees, regardless the changes in the air-fuel ratio, under the conditions that the power supply to the sensor is, for example, −0.2 volts which is out of the limiting current range.

If this phenomena are applied to determine the sensor's inactive state, more accurate determination of the sensor's inactive state can be realized as comparing with determination by the coolant temperature of the engine. By the way, −0.2 volts power supply to the sensor can be realized by setting 2.8 volts at V3 in FIG. 2, while 0.3 volts power supply to the sensor can be realized by setting 3.3 volts at V3. Therefore, the ECU transmits digital signals to the input terminal ITP of the sensor circuit such that the input voltage V3 to the operational amplifier OP2 is set to 2.8 volts at the start of the engine and 3.3 volts after a determined time has passed from the start of the engine, as explained before. The output voltage of the OP2 becomes 2.8 volts at the start of the engine and 3.3 volts after a determined time has passed from the start of the engine because the current generated from the sensor is 0 mA when the sensor detects the stoichiometric air-fuel ratio in the exhaust gas or when the sensor is inactive. However, the sensor generates about −15 mA and both outputs, OP2 and OP3, become about 2.0 volts when the sensor is in inactive state even though 2.8 volts is applied to the sensor at the start of the engine. It should be understood that more accurate determination of the sensor's active state can be realized by determining it based on the changes of the output voltages of the OP2 and OP3 than by determining it based on the coolant temperature of the engine.

Figure 5:
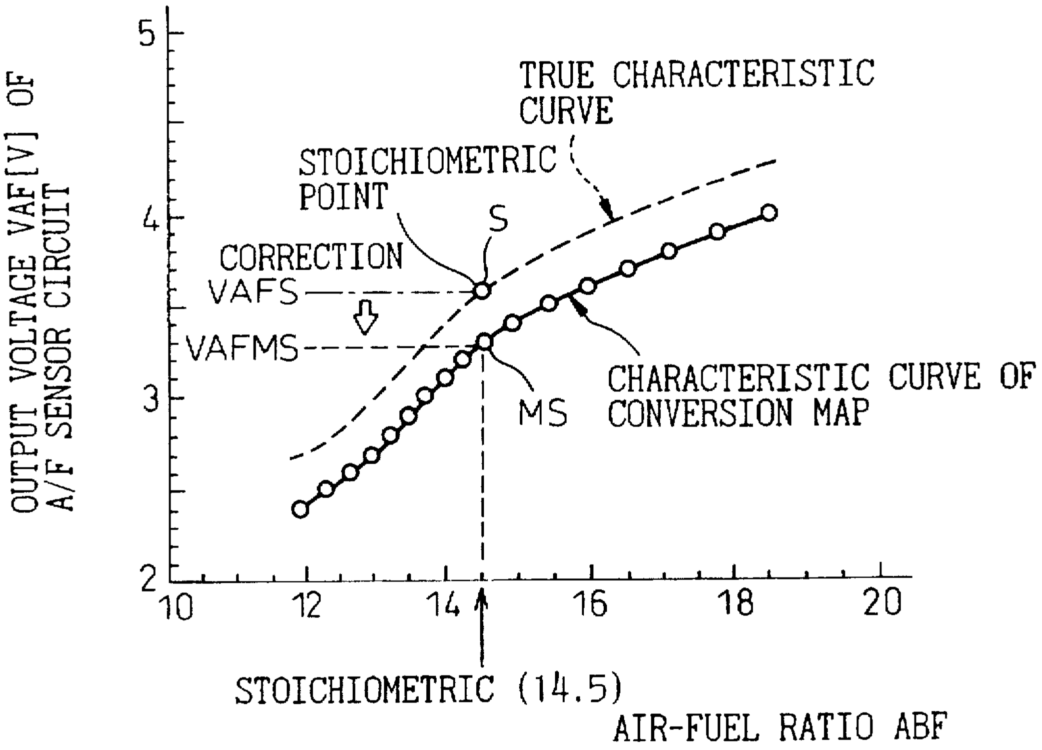
FIG. 5 is a diagram illustrating a conversion map of air-fuel ratios in an internal combustion engine corresponding to the outputs of an air-fuel ratio sensor circuit.

FIG. 5 is a diagram illustrating a conversion map of the air-fuel ratios in an engine corresponding to the outputs of the air-fuel ratio sensor circuit. In FIG. 5, the abscissa represents the air-fuel ratio ABF in the engine detected by the air-fuel ratio sensor and the ordinate represents the output voltage VAF of the sensor circuit. In FIG. 5, a thick solid line represents a characteristic curve of the conversion map found in advance, by bench testing, in order to calculate the air-fuel ratios in the engine corresponding to the outputs of the sensor circuit. The data for forming the conversion map are measured in advance, by bench testing, by using a reference air-fuel ratio sensor and a reference air-fuel ratio sensor circuit, and are stored in the storage circuit RAM. In FIG. 5, broken lines represent a characteristic curve of an air-fuel ratio sensor circuit used in a real engine and formed in a manner as described below. The characteristic curve shown in FIG. 5 is somewhat exaggerated to ease understanding. First, a point S is plotted at which the output voltage VAF of the sensor circuit equals to a stoichiometric voltage VAFS that is measured by using the sensor and the sensor circuit that are mounted on the real engine and the air-fuel ratio is stoichiometric, i.e., 14.5.

Next, a procedure to calculate the stoichiometric voltage VAFS will be explained. As explained before, when a digital signal is transmitted to the input terminal IT of the sensor circuit from the ECU such that the power supply to the sensor becomes –0.2 volts, namely, the input voltage V3 to the OP2 in the sensor circuit becomes 2.8 volts for five seconds after the start of the engine, the output voltage of the sensor circuit remains almost constant, about 2.8 volts, as long as the sensor is inactive. Thus, the stoichiometric voltage VAFS can be obtained by reading the output voltage of the sensor circuit at this time, and adding 0.5 volts to the read data because the current generated from the sensor is 0 mA regardless of the detected air-fuel ratio as long as the sensor is in an inactive state when a voltage out of the limiting current, in the case of this embodiment, –0.2 volts, is applied to the sensor.

Next, the point MS corresponding to the stoichiometric air-fuel ratio is plotted on a characteristic curve of a conversion map indicated by a solid line as shown in FIG. 5, and an output voltage VAFMS of the sensor circuit corresponding to the point MS is read. Then, a plurality of points on the characteristic curve of the conversion map are shifted and plotted in the direction of the axis of ordinate with the distance of VAFS–VAFMS, and a new characteristic curve of the conversion map for real use is created by connecting these plotted points with broken lines. The output voltage VAF of the sensor circuit corresponding to an air-fuel ratio, measured in the real engine, approximately coincides with the output voltage corresponding to the same air-fuel ratio, read from the newly created characteristic curve shown by the broken lines. Therefore, an accurate air-fuel ratio in the engine can be calculated by executing the steps of reading output voltage VAF of the sensor circuit, calculating the equation VAF–(VAFS–VAFMS), updating VAF by the results of the calculation VAF–(VAFS–VAFMS), and reading the air-fuel ratio corresponding to a point for the updated VAF on the characteristic curve originally made by bench testing.

Figure 6:
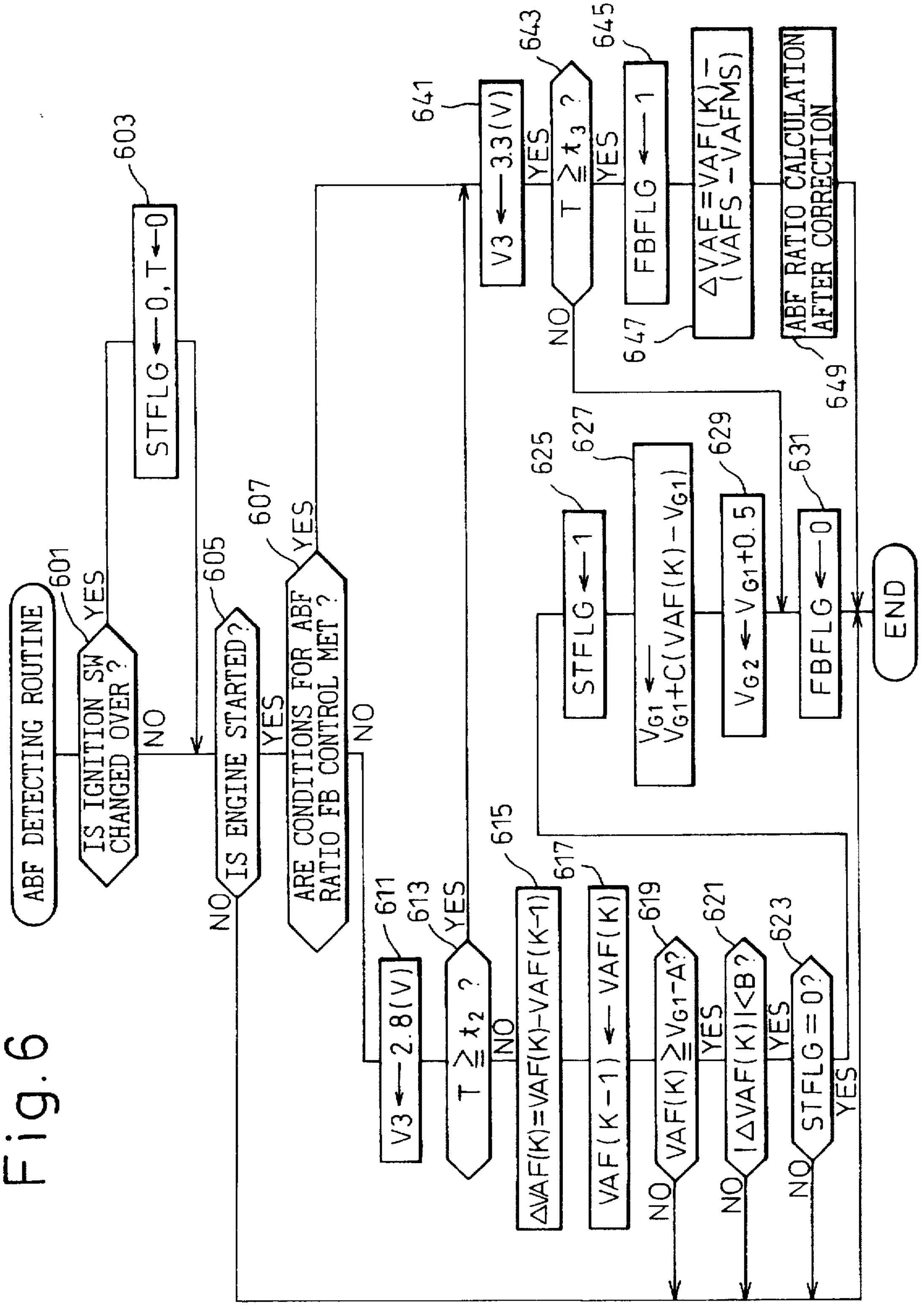
FIG. 6 is a flowchart showing a processing sequence of a routine for detecting an air-fuel ratio (A/F) according to the present invention.

FIG. 6 is a flowchart showing a processing sequence of a routine for detecting an air-fuel ratio (A/F) according to the present invention. This flowchart shows a routine that accurately detects the air-fuel ratio (A/F) according to the present invention with the use of an air-fuel ratio sensor and an air-fuel ratio sensor circuit carried on a real automobile. This routine is executed every predetermined number of degrees in the crank angle of the engine, for example, every 180 degrees in crank angle (180° CA) or every predetermined period of time, for example, every 100 msec. The detecting means, the determining means and the compensating means of the present invention are carried out by executing processes of steps 601 to 619, a step 621 and steps 623 to 649 respectively. The flowchart shown in FIG. 6 will be explained in detail below.

First in step 601, it is determined whether or not the ignition switch is changed over from off to on. If it is determined yes, the processing cycle of the routine proceeds to step 603, if it is determined no, the cycle proceeds to step 605. In the step 603, a preset start flag STFLG and a timer T are reset, and the cycle proceeds to the step 605. In the step 605, it is determined whether or not the engine is started. This is determined by whether or not the number of revolutions NE of the engine exceeds 400 RPM (revolution per minute). If the number NE is equal or more than 400 RPM (NE≧400), it is determined that the engine is started and the cycle proceeds to step 607, if the number NE is less than 400 RPM (NE<400), the cycle ends. In the step 607, it is determined whether or not conditions for the air-fuel ratio feedback control of the engine are met. If the result is yes, the cycle proceeds to step 641, if the result is no, the cycle proceeds to step 611. It is determined that the above conditions are met if all the following conditions (1) to (4) are met.

(1) The engine is not in the start-up time. (T>5 sec)
(2) The fuel cut control is not being executed.
(3) The coolant temperature THW of the engine is equal to or greater than 40° C. (THW≧40° C.).
(4) The air-fuel ratio sensor is active.

Next, in the step 611, a digital signal is transmitted from the ECU to the D/A converter in the air-fuel ratio sensor circuit so that the voltage V3 shown in FIG. 2 is set 2.8 volts. In step 613, it is determined whether or not a determined time $t_2$, for example, 5 seconds or more has passed, from the start-up of the engine, if the result is yes, the cycle proceeds to step 641, if the result is no, the cycle proceeds to step 615. In the step 615, the current output voltage VAF of the sensor circuit is read, and the difference $\Delta VAF_{(K)}$ between an output voltage $VAF_{(k-1)}$ of the previous processing cycle and an output voltage $VAF_{(k)}$ of the current processing cycle is calculated in accordance with the equation $\Delta VAF_{(K)}=VAF_{(k)}—VAF_{(k-1)}$, and the cycle proceeds to step 617. In the step 617, the current output voltage $VAF_{(K)}$ read in the step 615 is replaced as the previous output voltage $VAF_{(K-1)}$ for the use in the next processing cycle.

Next, in step 619, it is determined whether the current output voltage $VAF_{(K)}$ is equal to or greater than a value of ($V_{G1}$—A) wherein $V_{G1}$ is a learned value of the air-fuel ratio when the air-fuel ratio sensor is in an inactive state and A is a predetermined value, for example, 0.1 volt. If the result in the step 619 is yes, the cycle proceeds to step 621, if the result is no, the cycle ends. As shown in FIG. 3, the output voltage VAF of the sensor circuit increases when the engine is started at $t_0$ and saturates at $t_1$ up to the voltage of 2.8 volts equal to the voltage of V3. Therefore, in the step 619, it is determined whether the output voltage VAF of the sensor circuit has saturated or not at $t_1$, after the engine is started. Next, in step 621, it is determined whether the output voltage VAF of the sensor circuit is changed or not in response to a change in state of the air-fuel ratio sensor from inactive to active. This is determined by whether or not $\Delta VAF_{(K)}$ calculated in the step 615 is within a predetermined value. That is, if $|\Delta VAF_{(K)}|<B$, the cycle proceeds to step 623 because it is determined that the air-fuel ratio sensor is in an inactive state resulting from no change in the output voltage of the air-fuel ratio sensor circuit in response to the change in state in the sensor from inactive to active. If $|\Delta VAF_{(K)}| \geqq B$, the cycle ends because it is determined that the air-fuel ratio sensor is in an active state. In this embodiment, B is set, for example, 0.02 volts.

Next, in the step 623, it is determined whether or not the start flag STFLG is 0, if the result is yes, the cycle proceeds to step 625, if the result is no, the cycle ends. Next, in the step 625, the start flag is set to 1. Accordingly, processes in the steps 625 to 631 are executed in only the first cycle after the engine is started, but are not executed from the second cycle after the engine is started and the cycle ends because the result in the step 623 is no. Next, in step 627, the learned value $V_{G1}$ of the inactive air-fuel ratio is replaced by executing the following calculation.

$$V_{G1} \leftarrow V_{G1} + C(VAF_{(K)} - V_{G1})tm$$

Wherein, C is a moving averaging constant of which value is, for example, 1/16. As can be understood, the learned value $V_{G1}$ is given by deducting the learned value $V_{G1}$ in the previous processing cycle from the output voltage $VAF_{(K)}$ of the sensor circuit read in the current processing cycle, multiplying the moving averaging constant C by the result of the reduction and adding the learned value $V_{G1}$ to the result of the multiplication, and by replacing the learned value $V_{G1}$ with the result of the calculation. The learned value $V_{G1}$ of the inactive state air-fuel ratio and the learned value $V_{G2}$ of the stoichiometric air-fuel ratio are preset to 2.8 and 3.3 volts, respectively, when shipping automobiles equipped with the air-fuel ratio detecting device according to the present invention. Next, in step 629, the learned value $V_{G2}$ of the stoichiometric air-fuel ratio with the use of the air-fuel ratio sensor and the sensor circuit carried on a real automobile is calculated by the following calculation.

$$V_{G2} \leftarrow V_{G1} + 0\ 5$$

Next, in step 631, the flag FBFLG that indicates whether or not the conditions for the air-fuel ratio feedback control of the engine are met is reset to 0 and the cycle ends.

On the other hand, if it is determined that conditions for the air-fuel ratio feedback control of the engine are met in the step 607, or if it is determined that five seconds or more has passed after the engine is started in the step 613, the cycle proceeds to the step 641 and a digital signal is transmitted to the D/A converter in the sensor circuit from the ECU so as to set the voltage of V3 shown in FIG. 2 at 3.3 volts. Next, in step 643, it is determined whether or not a predetermined time $t_3$, for example, ten seconds or more, has passed since the engine started. If the result is yes, the cycle proceeds to step 645, the flag FBFLG is set to 1 and the cycle ends. If the result is no, the cycle proceeds to step 631, the flag FBFLG is reset to 0 and the cycle ends.

Next, in step 647, the output voltage VAF of the sensor circuit used for the real automobile is calibrated in accordance with the following equation:

$$VAF = VAF_{(K)} - (VAFS - VAFMS)$$

based upon (1) the learned value $V_{G2}$ for stoichiometric air-fuel ratio obtained by executing the step 629, namely, the stoichiometric voltage VAFS, (2) the output voltage VAFMS of the reference air-fuel ratio sensor circuit corresponding to, for example, the stoichiometric air-fuel ratio 14.5 on the conversion map that has been made in advance by the bench test with the use of the reference air-fuel ratio sensor and the reference air-fuel ratio sensor circuit, and (3) the output voltage $VAF_{(K)}$ of the air-fuel ratio sensor circuit detected in this processing cycle, and the cycle then proceeds to step 649.

In the step 649, the air-fuel ratio in the engine corresponding to the output voltage VAF of the air-fuel ratio sensor circuit obtained by the calibration in the step 647 is calculated, i.e., the air-fuel ratio after correction is calculated based on the conversion map that has been formed in advance and stored in a storage circuit such as a RAM. This corresponds to finding a point on a characteristic curve represented by broken lines shown in FIG. 5 by shifting a point on the characteristic curve of the conversion map formed in advance by the bench test represented by a solid line shown in FIG. 5 in the direction of the axis of ordinate with the distance of VAFS—VAFMS corresponding to an output voltage $VAF_{(K)}$ of the air-fuel ratio sensor circuit detected at this processing cycle. Hereinafter, the fuel injection amount controlling means of the present invention will be described.

Figure 7:
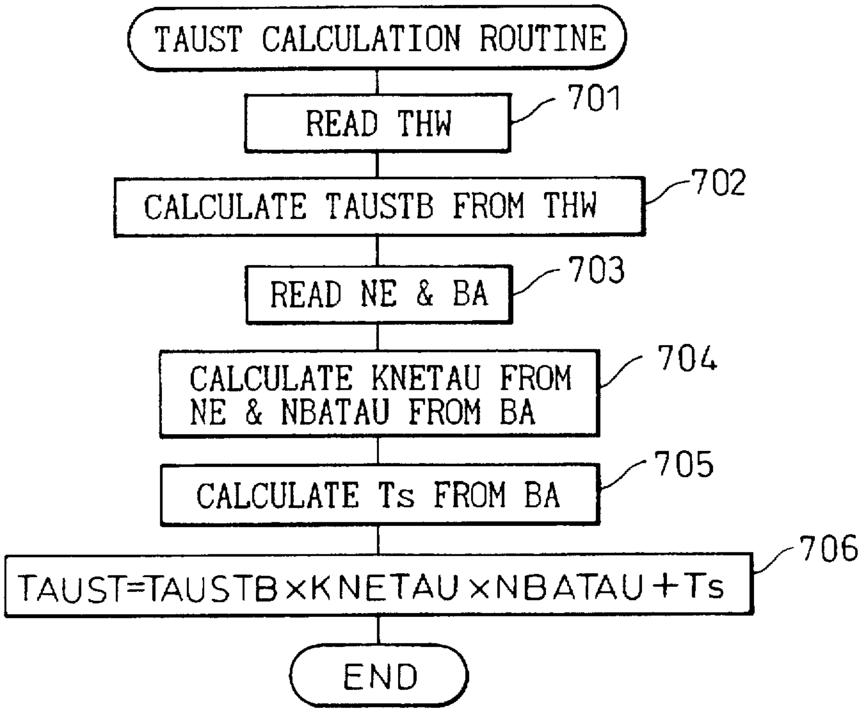
FIG. 7 is a flowchart showing a processing sequence of a routine for calculating a cranking fuel injection period (TAUST) according to the present invention.

FIG. 7 is a flowchart showing a processing sequence of a routine for calculating a cranking fuel injection period (TAUST) according to the present invention. This routine is executed in a main routine of the EUC. In step 701, the coolant temperature THW of the engine is read from a coolant temperature sensor arranged in a water jacket of the engine block. In step 702, a basic fuel injection period TAUSTB is calculated from a map stored in the ROM based on the coolant temperature THW read in the step 702. In step 703, the number of revolutions NE of the engine is read from the crank angle sensor and the battery voltage BA is read via an A/D converter (not shown). In step 704, the correction coefficients KNETAU and NBATAU are calculated from maps stored in the ROM based on the number of revolutions NE of the engine and the battery voltage BA both read in the step 702. In step 705, an ineffective fuel injection period Ts is calculated from a map stored in the ROM based on the battery voltage read in the step 702. In step 706, the post-cranking fuel injection period TAUST is calculated in accordance with the following equation based on the basic fuel injection period TAUSTB, the correction coefficients KNETAU and NBATAU and the ineffective fuel injection period Ts, each obtained in the steps 702, 704 and 705.

$$TAUST = TAUSTB * KNETAU * NBATAU + Ts(msec)$$

Figure 8:
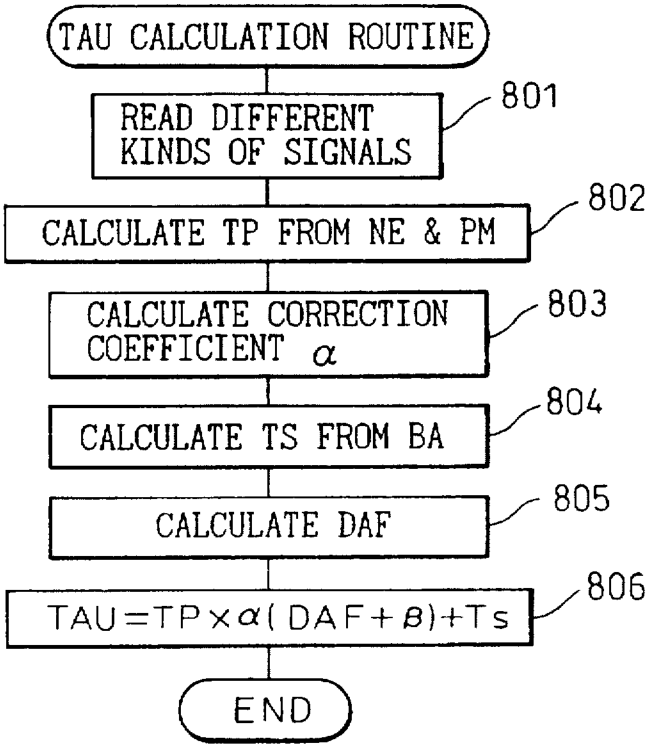
FIG. 8 is a flowchart showing a processing sequence of a routine for calculating a post-cranking fuel injection period (TAU) according to the present invention.

FIG. 8 is a flowchart showing a processing sequence of a routine for calculating a post-cranking fuel injection period (TAU) according to the present invention. In step 801, different kinds of signals are read as input data. In step 802, the basic fuel injection period TP corresponding to the engine operational condition is calculated from a two dimensional map stored in the ROM based on the number of revolutions NE and the intake air pressure PM of the engine read in the step 801. In step 803, a correction coefficient a is calculated based on the coolant temperature THW, the throttle opening TA, the intake air temperature THA and etc.. Next, in step 804, the ineffective fuel injection period Ts is calculated from a map stored in the ROM based on the battery voltage BA. In step 805, the air-fuel ratio correction coefficient DAF is calculated from the difference between the air-fuel ratio in the engine calculated in the step 649 in the flowchart shown in FIG. 6 and a target air-fuel ratio, for example, the stoichiometric air-fuel ratio in this embodiment such that the correction coefficient DAF is decreased when the air-fuel ratio in the engine is rich, while it is increased when the air-fuel ratio in the engine is lean. The air-fuel ratio correction coefficient DAF is calculated in response to the output value of the air-fuel ratio sensor circuit in such a way that DAF=1.0 when an increase or a decrease correction is not made, $0.8 < DAF < 1.0$ when a decrease correction is made, and $1.0 < DAF < 1.2$ when an increase correction is made. This air-fuel ratio correction coefficient DAF is a feedback correction coefficient to control the air-fuel ratio in the engine to be a stoichiometric. In step 806, the post-cranking fuel injection period TAU is calculated in accordance with the following equation based on the basic fuel injection period TP, the correction coefficient a, the ineffective fuel injection period Ts and the air-fuel ratio correction coefficient DAF, in the steps of 802, 803, 804 and 805 respectively.

$$TAU=TP*\alpha(DAF+\beta)+Ts$$

Wherein $\beta$is another coefficient different from DAF.

Figure 9:
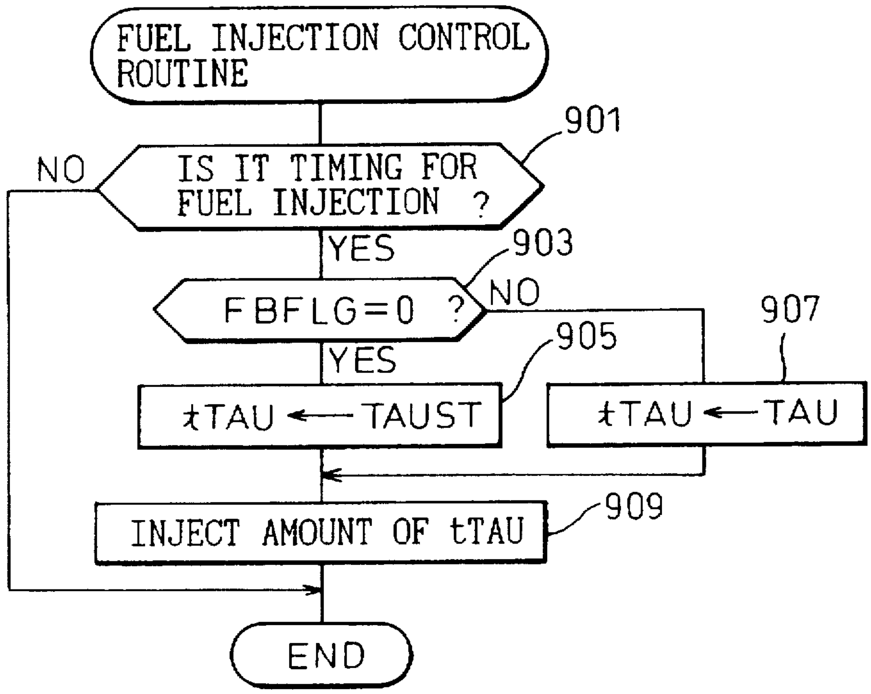
FIG. 9 is a flowchart showing a processing sequence of a fuel injection control routine according to the present invention.

FIG. 9 is a flowchart showing a processing sequence of a fuel injection control routine according to the present invention. The fuel injection means of the present invention is carried out by executing processes in the flowchart shown in FIG. 9. This fuel injection routine is executed for each cylinder every 30 degrees in crank angle (30° CA) at the time when the 30° CA sensor outputs the signal to the ECU. This 30° CA interrupt routine starts when the ignition switch is turned on and ends when the ignition switch is turned off. First, in step 901, it is determined whether or not it is the timing for fuel injection from the crank angle sensor signal. If the result is yes, the cycle proceeds to step 903, if the result is no, the cycle ends. In the step 903, it is determined whether or not the previously set flag FBFLG is 0 (indicating the conditions are not met) by executing the air-fuel ratio detecting routine explained with reference to FIG. 6, wherein the flag FBFLG=1 indicates that conditions for the air-fuel ratio feedback control of the engine are met. If the result is yes, the cycle proceeds to step 905, if the result is no, the cycle proceeds to step 907. In the step 905, the cranking fuel injection period TAUST of the engine as explained with reference to FIG. 7 is set as the current fuel injection period tTAU. In the step 907, the post-cranking fuel injection period TAU of the engine as explained with reference to FIG. 8 is set as the current fuel injection period tTAU. Next, in step 909, the fuel injection valves are opened to inject the fuel toward the cylinders of the engine in accordance with the fuel injection period tTAU calculated in the step 905 or 907.

As heretofore explained, according to the air-fuel ratio detecting device and the method of the present invention, the air-fuel ratio can be accurately detected and the exhaust gas of the engine can be more purified by controlling the amount of the fuel injection based on the air-fuel ratio detected by the air-fuel ratio detecting device.

It will be understood by those skilled in the art that the foregoing description is a preferred embodiment of the disclosed device and that various changes and modifications may be made in the invention without departing from the spirit and scope thereof.

The invention claimed is:

1. An air-fuel ratio detecting device for detecting an air-fuel ratio in an internal combustion engine comprising:

a limiting current type air-fuel ratio sensor arranged in an exhaust system of the engine, wherein the air-fuel ratio sensor is made from solid electrolyte and generates an electric current when a voltage is applied thereto;

an air-fuel ratio sensor circuit for applying a voltage to the air-fuel ratio sensor within a range of a limiting current, wherein the air-fuel ratio sensor circuit detects a concurrent limiting current and outputs a voltage proportional to a magnitude of the detected current;

a detecting means for detecting a change in the voltage output from the air-fuel ratio sensor circuit when a voltage applied to the sensor is changed from a voltage within the range of the limiting current to a voltage outside the range of the limiting current, wherein the voltage applied to the air-fuel ratio sensor is changed from a voltage within the range of the limiting current to a voltage outside the range of the limiting current a predetermined time after the engine has been started;

a determining means for determining that the air-fuel ratio sensor is in an inactive state when the change in the voltage output from the air-fuel ratio sensor circuit detected by the detecting means is less than a predetermined value; and a correcting means for correcting an output error of the air fuel ratio sensor circuit based on the voltage output from the air-fuel ratio sensor circuit when the determining means determines that the air-fuel ratio sensor is in the inactive state when the change in the voltage output from the air-fuel ratio sensor is less than the predetermined value.

2. An air-fuel ratio detecting device according to claim 1, wherein the correcting means corrects the output error of the air-fuel ratio sensor circuit based on the difference between a first voltage output from the air-fuel ratio sensor circuit when it is determined that the air-fuel ratio sensor is in the inactive state and a second voltage corresponding to a stoichiometric air-fuel ratio read from a map previously created with a reference air-fuel ratio sensor and a reference air-fuel ratio sensor circuit.

3. A method for detecting an air-fuel ratio in an internal combustion engine including an air-fuel ratio detecting device comprising a solid electrolyte limiting current type air-fuel ratio sensor arranged in an exhaust system of the engine, wherein the air-fuel ratio sensor generates an electric current when a voltage is applied thereto, and wherein the air-fuel ratio detecting device further includes a vehicle air-fuel ratio sensor circuit for applying the voltage to the sensor within a range of a limiting current of the air-fuel ratio sensor, wherein the vehicle sensor circuit detects a concurrent limiting current and outputs a voltage proportional to a magnitude of the detected currents said device detecting the air-fuel ratio in the engine based on the output of the vehicle sensor circuit, comprising the steps of:

detecting a change in the voltage output from the vehicle sensor circuit when, a predetermined time after the engine has been started, a voltage applied to the sensor is changed from a voltage within the range of the limiting current to a voltage outside the range of the limiting current;

determining whether the detected change in the voltage output from the vehicle sensor circuit is less than a predetermined vaule;

reading a first output data of the vehicle sensor circuit when it is determined that the output voltage change is less than the predetermined value;

reading from a previously created map a second output data corresponding to a stoichiometric air-fuel ratio, wherein the map is produced with a reference sensor and a reference sensor circuit;

correcting, after the predetermined time has elapsed since the engine was started, the data output from the vehicle sensor circuit based on a difference between the first output data and the second output data; and calculating a corrected air-fuel ratio corresponding to the corrected output data.

* * * * *